United States Patent
Di Febbo et al.

(10) Patent No.: US 11,755,854 B2
(45) Date of Patent: Sep. 12, 2023

(54) VISUAL MARKER

(71) Applicant: Apple Inc., Cupertino, CA (US)

(72) Inventors: Paolo Di Febbo, Redwood City, CA (US); Chaminda N. Vidanagamachchi, Cupertino, CA (US); Waleed Abdulla, Sunnyvale, CA (US); Yohan Rajan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 17/350,515

(22) Filed: Jun. 17, 2021

(65) Prior Publication Data

US 2022/0019752 A1 Jan. 20, 2022

Related U.S. Application Data

(60) Provisional application No. 63/051,529, filed on Jul. 14, 2020.

(51) Int. Cl.
*G06K 7/10* (2006.01)
*G06K 7/14* (2006.01)
*G06K 19/06* (2006.01)

(52) U.S. Cl.
CPC ....... *G06K 7/10722* (2013.01); *G06K 7/1417* (2013.01); *G06K 19/0614* (2013.01); *G06K 19/06037* (2013.01)

(58) Field of Classification Search
CPC . G06K 7/10722; G06K 7/1417; G06K 7/1434
(Continued)

(56) References Cited

U.S. PATENT DOCUMENTS

| | | | |
|---|---|---|---|
| 7,185,816 B1 * | 3/2007 | Shoobridge | G06K 19/06037 |
| | | | 235/462.04 |
| 10,679,024 B2 | 6/2020 | Bachelder et al. | |

(Continued)

FOREIGN PATENT DOCUMENTS

| | | |
|---|---|---|
| CN | 106778434 | 5/2017 |
| CN | 108253932 | 7/2018 |

(Continued)

OTHER PUBLICATIONS

European Patent Office (ISA/EP), International Search Report and Written Opinion, International Application No. PCT/US2021/040993, 14 pages, dated Sep. 28, 2021.

*Primary Examiner* — Toan C Ly
(74) *Attorney, Agent, or Firm* — Thompson Hine LLP

(57) ABSTRACT

Various implementations disclosed herein include multi-scale visual markers that convey information in multiple sets of markings using different respective appearance attributes. In some implementations, the appearance attribute of the markings of a first set of markings corresponds to a first encoding parameter and the appearance attribute of markings of a second set of markings corresponds to a second encoding parameter different from the first encoding parameter. In some implementations, the first set of markings encode first data and the second set of markings are different than the first set of markings and encode second data. In some implementations, the different appearance attributes are different scales (e.g., different sizes, different numbers of markings per unit of space, different contrast, different color characteristics, different wavelengths, different image sensor types, etc.).

20 Claims, 9 Drawing Sheets

(58) Field of Classification Search
USPC .................................................. 235/462.11
See application file for complete search history.

(56) References Cited

U.S. PATENT DOCUMENTS

| | | |
|---|---|---|
| 10,691,908 B2 | 6/2020 | Howard et al. |
| 2001/0045461 A1 | 11/2001 | Schuessler |
| 2003/0121980 A1 | 7/2003 | Lemelson et al. |
| 2005/0269416 A1 | 12/2005 | Sussmeier et al. |
| 2006/0022059 A1* | 2/2006 | Juds ................ G06K 19/06056 235/494 |
| 2009/0255992 A1 | 10/2009 | Shen |
| 2012/0211567 A1 | 8/2012 | Herzig |
| 2012/0256000 A1 | 10/2012 | Cok |
| 2014/0061320 A1 | 3/2014 | Guenter et al. |
| 2014/0097251 A1* | 4/2014 | Joussen ................ G06K 7/1491 235/462.07 |

FOREIGN PATENT DOCUMENTS

| | | |
|---|---|---|
| DE | 102012015695 A1 | 6/2014 |
| EP | 0342772 A2 | 11/1989 |

* cited by examiner

VISUAL MARKER

CROSS-REFERENCE TO RELATED APPLICATION

This Application claims the benefit of U.S. Provisional Application Ser. No. 63/051,529 filed Jul. 14, 2020, which is incorporated herein in its entirety.

TECHNICAL FIELD

The present disclosure generally relates to visual markers that convey information and to systems, methods, and devices that capture and interpret images of such visual markers to obtain and use the conveyed information.

BACKGROUND

Visual markers exist today in the form of barcodes, Quick Response (QR) codes, and other proprietary formats. QR codes encode binary data such as strings or other payloads.

SUMMARY

Various implementations disclosed herein include multi-scale visual markers. In some implementations, the multi-scale visual marker encodes data in multiple sets of markings using different appearance attributes. In some implementations, the different appearance attributes are different sizes or different numbers of markings per unit of space. In some implementations, the different appearance attributes include a color characteristic such as contrast. In some implementations, the different appearance attributes include wavelength or image sensor type. In some implementations, the multi-scale visual marker encodes different information in each of the multiple sets of markings. In some implementations, different information is encoded at each of the different scales of the multi-scale visual marker. In some implementations, the different appearance attributes in the multi-scale visual marker correspond to different detection or encoding/decoding techniques. Various other implementations disclosed herein decode or otherwise interpret increasingly higher-resolution images or higher-detail images to hierarchically detect and decode the different appearance attributes of the multiple sets of markings of the multi-scale visual marker. In some implementations, the different appearance attributes in the multi-scale visual marker provide power efficient detection and decoding using hierarchical cascaded processing at both an image sensor (e.g., camera) implementation and a processor (e.g., system-on-chip (SOC) implementation.

In some implementations, the visual marker includes a first set of markings that encode first data and a second set of markings that encode second data, where the second set of markings are different than the first set of markings. In some implementations, markings of the first set differ from markings of the second set with respect to an appearance attribute, where the appearance attribute of the markings of the first set corresponds to a first encoding parameter and the appearance attribute of markings of the second set corresponds to a second encoding parameter different from the first encoding parameter.

In some implementations, at an electronic device having a processor, a method includes obtaining a first image of a physical environment according to a first image capture parameter, where the physical environment includes a visual marker. In some implementations, a first set of markings of the visual marker is detected in the first image. In some implementations, a second image of the physical environment is obtained according to a second image capture parameter different from the first image capture parameter, where the second image is obtained based on detecting the first set of markings. In some implementations, a second set of markings of the visual marker is decoded in the second image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
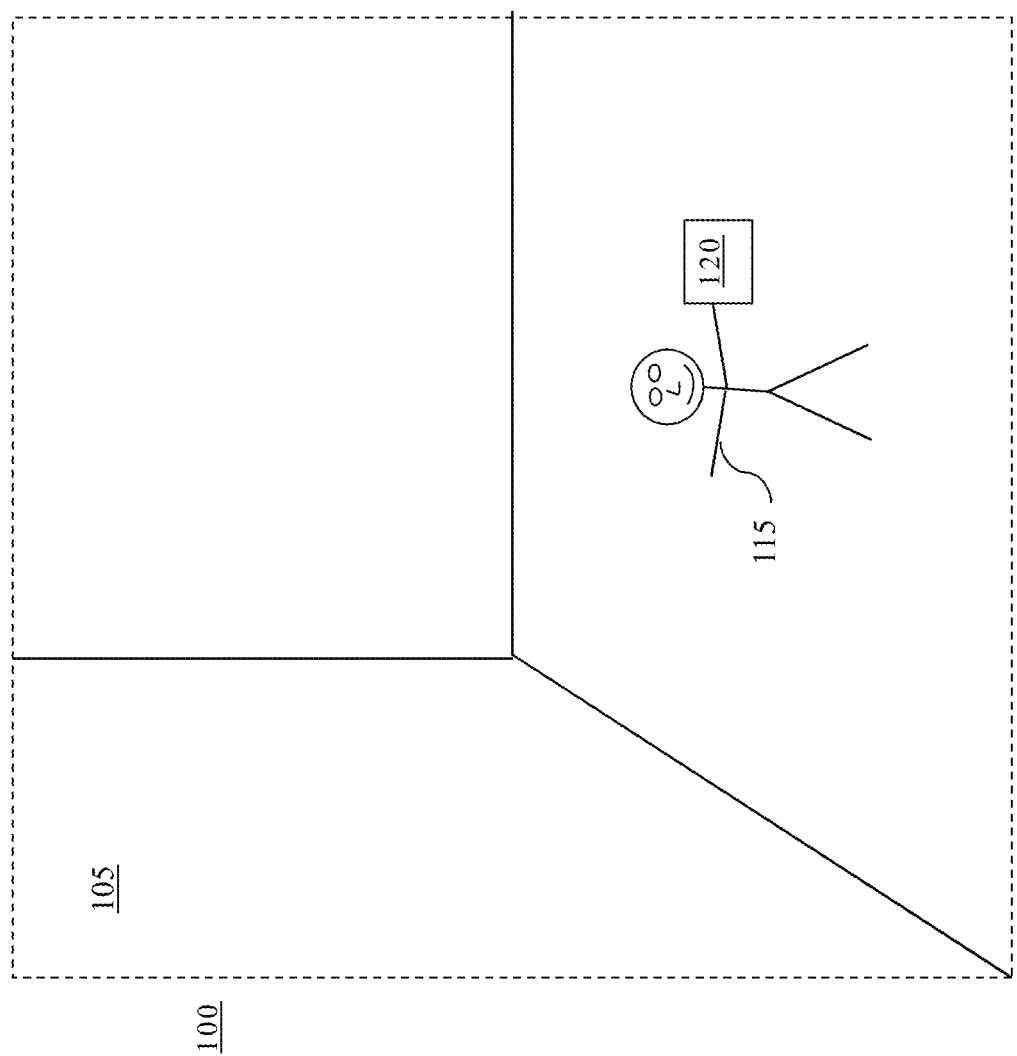
FIG. 1 is a diagram of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example operating environment 100 in which electronic device 120 is used in physical environment 105. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a head-mounted device (HMD), and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 120 may communicate with one another via wired or wireless communications.

In some implementations, the electronic device 120 is configured to create, capture, interpret, and use a multi-scale visual marker, for example, to present content to the user 115. In some implementations, the electronic device 120 captures one or more images of the physical environment including the multi-scale visual marker. In some implementations, the multi-scale visual marker encodes data in multiple sets of markings using different appearance attributes. The electronic device 120 may identify the multi-scale visual marker in the one or more images and to hierarchically detect and decode or otherwise interpret the multiple sets of markings of the multi-scale visual marker.

Figure 2:
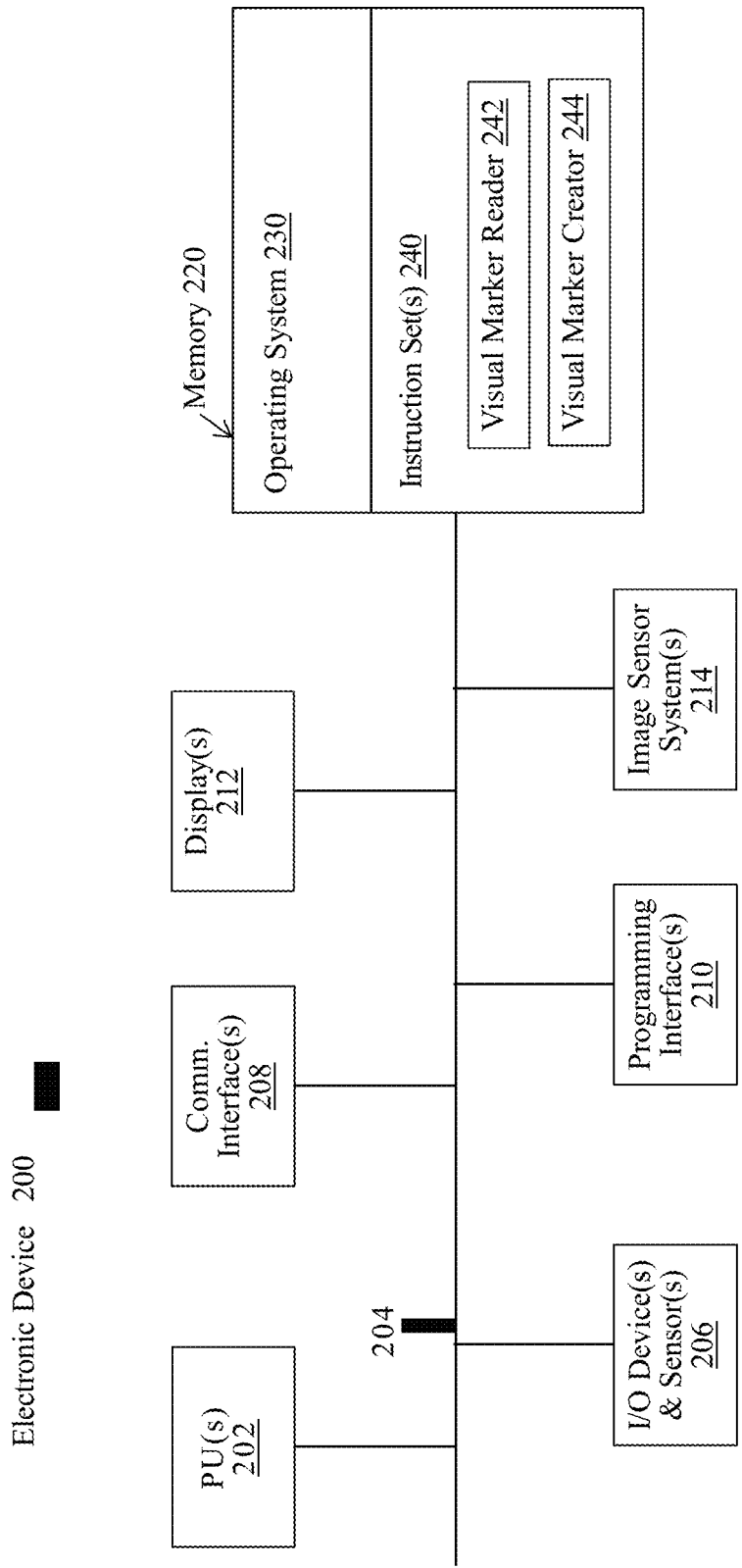
FIG. 2 is a diagram of an example electronic device in accordance with some implementations.

FIG. 2 is a block diagram of an example device 200. Device 200 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 200 includes one or more processing units 202 (e.g., microprocessors, ASICs, FPGAs, GPUs, CPUs, processing cores, or the like), one or more input/output (I/O) devices and sensors 206, one or more communication interfaces 208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 210, one or more displays 212, one or more interior or exterior facing sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 212 are configured to present content to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 212 correspond to diffractive, reflective, polarized, holographic, etc. waveguide displays. For example, the electronic device 200 may include a single display. In another example, the electronic device 200 includes a display for each eye of the user.

In some implementations, the one or more interior or exterior facing sensor systems 214 include an image capture device or array that captures image data or an audio capture device or array (e.g., microphone) that captures audio data. The one or more image sensor systems 214 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 214 further include an illumination source that emits light such as a flash. In some implementations, the one or more image sensor systems 214 further include an on-camera image signal processor (ISP) configured to execute a plurality of processing operations on the image data.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium.

In some implementations, the memory 220 or the non-transitory computer readable storage medium of the memory 220 stores an optional operating system 230 and one or more instruction set(s) 240. The operating system 230 includes procedures for handling various basic system services and for performing hardware dependent tasks. In some implementations, the instruction set(s) 240 include executable software defined by binary information stored in the form of electrical charge. In some implementations, the instruction set(s) 240 are software that is executable by the one or more processing units 202 to carry out one or more of the techniques described herein. In some implementations, functions or operations to carry out one or more of the techniques described herein that are performed by the instruction set(s) 240 are implemented purely in dedicated hardware circuitry (e.g., silicon IP, hardware accelerators, etc.), or in some mix of both.

In some implementations, the instruction set(s) 240 include a visual marker reader 242 that is executable by the processing unit(s) 202 to identify a multi-scale visual marker, and interpret information conveyed by the multi-scale visual marker by detecting or decoding multiple sets of markings in different images. The different images may be captured using different image capture parameters, for example, being captured from different distances away from the visual marker, using different optical and/or digital zoom levels, using different filters, etc. In some implementations, the visual marker reader 242 is executed to detect and interpret a multi-scale visual marker present in one or more images of a physical environment captured, for example, by one or more interior or exterior facing sensor systems 214.

In some implementations, the instruction set(s) 240 include a visual marker creator 244 that is executable by the processing unit(s) 202 to create multi-scale visual markers that encode data in multiple sets of markings using different respective appearance attributes according to one or more of the techniques disclosed herein.

Although the instruction set(s) 240 are shown as residing on a single device, it should be understood that in other implementations, any combination of the elements may be located in separate computing devices. FIG. 2 is intended more as a functional description of the various features which are present in a particular implementation as opposed to a structural schematic of the implementations described herein. As recognized by those of ordinary skill in the art, items shown separately could be combined and some items could be separated. For example, the actual number of instruction sets and the division of particular functions and how features are allocated among them will vary from one implementation to another and, in some implementations, depends in part on the particular combination of hardware, software, or firmware chosen for a particular implementation. In some implementations, hardware accelerators use computer hardware specially made to perform some functions more efficiently than software executing on a processor. Any transformation of data or routine that can be computed including one or more of the techniques disclosed herein for using visual markers, can be performed purely in program instructions computer-executable on a CPU, purely in custom-made hardware, or in some mix of both.

Figure 3:
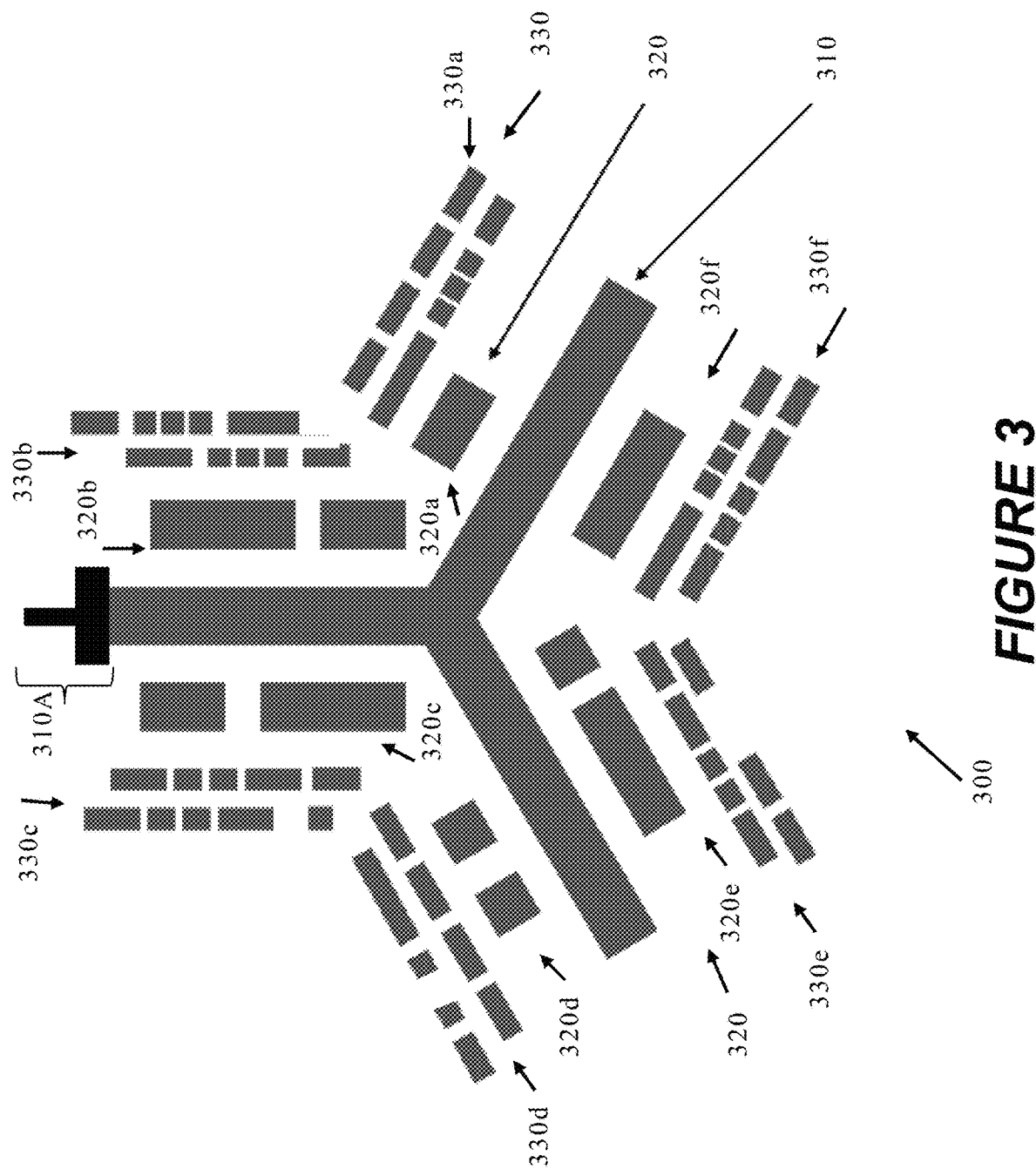
FIG. 3 is a diagram illustrating an exemplary multi-scale visual marker in accordance with some implementations.

FIG. 3 is a diagram illustrating an exemplary multi-scale visual marker in accordance with some implementations. In some implementations, the multi-scale visual marker encodes data in multiple sets of markings using different appearance attributes. In some implementations, the different appearance attributes are different scales. In some implementations, the multi-scale visual marker encodes different information at each of the different scales (e.g., of respective different sets of markings). In some implementations, the different appearance attributes are different sizes, different numbers of markings per unit of space, different contrast, different color characteristics, different wavelengths, different image sensor types, etc. In some implementations, the multi-scale visual marker encodes different types of information at each of the different scales. In some implementations, the different appearance attributes in the multi-scale visual marker correspond to different detection or encoding/decoding techniques.

In some implementations, increasingly higher-resolution images or higher-detail images from an image sensor are used to hierarchically detect and decode the different scales of the multi-scale visual marker. In some implementations, the different appearance attributes in the multi-scale visual marker provide power efficient detection and decoding using hierarchical cascaded processing at an image sensor (e.g., camera) implementation and a processor (e.g., system-on-chip (SOC)).

As shown in FIG. 3, a multi-scale visual marker 300 includes multiple sets of markings 310, 320, 330. In some implementations, the multi-scale visual marker 300 includes a first set of markings 310 of the multiple sets of markings. As shown in FIG. 3, the first set of markings 310 is a very high scale (e.g., very large size or a very low frequency (very few markings per unit of space)) feature in the multi-scale visual marker 300. In some implementations, the first set of markings 320 are used to encode first information for the multi-scale visual marker 300. In some implementations, the first set of markings 310 are used to detect whether a physical environment has a visual marker in it. In some implementations, the first set of markings 310 are used for a binary detection process (e.g., yes/no) that determines whether the multi-scale visual marker 300 is in an image (e.g., within an image sensor field of view (FOV) of a physical environment). In some implementations, the first set of markings 310 are detected using low resolution images (e.g., a 128×128 pixel full-FOV images). In some implementations, the image sensor FOV matches a FOV of a user of the electronic device, for example, in an HMD implementation in which the device provides views to the user that correspond to images are used to detect and/or decode the multi-scale visual marker 300.

In some implementations, a first stage of hierarchical processing at a detection device is configured to detect and decode the first set of markings 310. Such a first stage may be implemented at an image sensor (e.g., camera) and/or processor (e.g., SOC) of a detecting electronic device. In some implementations, the first set of markings 310 enables power efficient detection because the image sensor and/or the processor used in the detecting electronic device may be configured to capture and/or process relatively small numbers of pixels to detect and/or decode the first set of markings 310. In some implementations, the first set of markings 310 (e.g., a first stage of the hierarchical implementation) may be detected in one or more images and/or decoded using a first (e.g., always-on) domain of a SOC. The first domain may operate continuously whenever a device is being powered on, whenever the device is in a particular mode (e.g., visual marker detection mode), whenever an app that uses visual markers is active, or in other predetermined circumstances.

In some implementations, the multi-scale visual marker 300 includes a second set of markings 320 of the multiple sets of markings. As shown in FIG. 3, the second set of markings 320 is a smaller scale (e.g., smaller size or higher frequency) feature in the multi-scale visual marker 300. In some implementations, the second set of markings 320 are used to encode second information for the multi-scale visual marker 300. For example, such second information may be a category, type, or other classification for the multi-scale visual marker 300 (e.g., information visual marker, product/service visual marker, experience visual marker, emergency visual marker, etc.) used to discriminate among visual marker categories, types, or other classifications.

In some implementations, a second stage of the hierarchical processing at a detection device is configured to detect and decode the second set of markings 320. Such a second stage may be implemented at the image sensor and/or the processor. The second stage may be triggered based on detecting and/or decoding the first set of markings 310. For example, detecting and/or decoding the first set of markings 310 may identify that a multi-scale visual marker is present in the physical environment (e.g., in the image or FOV corresponding to a portion of the physical environment). In some implementations, the second set of markings 320 is captured using a higher resolution image (e.g., 256×256 pixel image) than the first set of markings 310. The higher resolution image may provide details or characteristics that are useful in detecting and/or decoding the second set of markings 320. In some implementations, the second set of markings 320 enables power efficient detection because the image sensor and/or the processor used in the detecting electronic device may be configured to capture and/or process relatively small numbers of pixels to detect and/or decode the second set of markings 320. In some implementations, the second set of markings 320 (e.g., used at a second stage of a hierarchical detection/decoding process) may be detected in the images and/or decoded using a second domain of a SOC. The second domain of the SOC may use relatively more power than a first (e.g., always-on) domain of the SOC that is used to detect/decode the first set of markings 310. However, the second domain may be selectively employed, for example, only being employed after being triggered based on detecting/decoding the first set of markings 310. The selective triggering of the second stage may reduce power consumption and otherwise improve the efficiency of the device.

In some implementations, the multi-scale visual marker 300 includes a third set of markings 330 of the multiple sets of markings. As shown in FIG. 3, the third set of markings 330 is an even smaller scale (e.g., even smaller size or very high frequency) feature in the multi-scale visual marker 300. In some implementations, the third set of markings 330 are used to encode third information for the multi-scale visual marker 300. In some implementations, such third information may be detailed information about the multi-scale visual marker 300 (e.g., unique ID for that object, a message, detailed product information, and so forth).

In some implementations, a third stage of the hierarchical processing at a detection device is configured to detect and decode the third set of markings 330. Such a third stage may be implemented at the image sensor and/or the processor. The third stage may be selectively triggered based on or following detecting and/or decoding the second set of markings 320. In one example, the third stage is enabled based on the detection and decoding of the second set of markings 320 identifying the second information that is of interest to the user of the detecting electronic device or meaningful to a user experience (e.g., preselected or selected in real-time). For example, the third hierarchical stage may be enabled based on the second set of markings 320 identifying a category of information that corresponds to a preselected category or preselected set of categories that the user identified as of interest.

In some implementations, detection of the third set of markings 330 is triggered based upon user input to the detecting electronic device. In one example, after decoding the second set of markings 320, the user is prompted to obtain additional details of the multi-scale visual marker 300. For example, such prompts may include directions to move the user closer to the multi-scale visual marker 300, to zoom-in the image sensor to the multi-scale visual marker 300, or otherwise obtain additional details including the third set of markings 330. The user may be prompted to obtain the additional images/details if the user is interested in the category, type, or classification of the visual marker identified based on the second set of markings 320. For example, a message may be displayed adjacent to a visual marker on a movie poster, the message identifying "To obtain additional details about this movie move closer or zoom in." Whether the third set of markings 330 is detected and/or decoded may thus depend upon whether the user is interested in the multi-scale visual marker 300 based the information provided by the second set of markings 320 (e.g., the category, type, or classification).

Various prompts may be used to obtain additional images of the visual marker sufficient to detect and/or decode the third set of visual markings 330. In one example, the multi-scale visual marker 300 is determined to be 90° to the right and 25 m away, and the user is prompted to turn to the right and move 15 m closer. In some implementations, detection of the third set of markings 330 uses a higher resolution image (e.g., 1024×1024 pixel image). In some implementations, the third set of markings 330 (e.g., detected and/or decoded at the third stage of a hierarchical implementation) may be detected in the images using a third domain of a SOC. The third stage may use more power than a second domain of the SOC. However, the third stage may be selectively triggered based on criteria and/or user input/action. The selective triggering of the third stage may reduce power consumption and otherwise improve the efficiency of the device. In some implementations, the first domain, the second domain, and the third domain of the SOC are implemented as multiple separate dedicated hardware circuits (e.g., silicon IP, hardware accelerators, etc.) that are enabled independently, hierarchically, or on demand.

In some implementations, each the multiple sets of markings 310, 320, 330 of the multi-scale visual marker 300 includes a plurality of groups of markings. As shown in FIG. 3, the multi-scale visual marker 300 includes 6 groups of markings 330a, 330b, 330c, 330d, 330e, 330f in the set of markings 330. Also shown in FIG. 3, the multi-scale visual marker 300 includes 6 groups of markings (320a, 320b, 320c, 330d, 320e, 320f) in the set of markings 320. In some implementations, the multi-scale visual marker 300 includes groups of markings in the set of markings 310.

In some implementations, the multi-scale visual marker 300 has a single detectable orientation. In some implementations, the multi-scale visual marker 300 uses one of the sets of markings or at least one additional feature to determine the single detectable orientation. As shown in FIG. 3, the first set of markings 310 includes an orientation indication 310A, which may be oriented in a prescribed direction (e.g., 12 o'clock), upon rectification of images containing the multi-stage visual marker 300. In some implementations, the orientation may be used to determine where to start to read, to decode, or otherwise to interpret the information represented by the multiple sets of markings 310, 320, 330. For example, reading data in the oriented multi-scale visual marker 300 may begin at 12 o'clock position and go clockwise (e.g., left-to-right in each group forming the set of markings) in each of the multiple sets of markings 310, 320, 330.

In some implementations, the first set of markings 310 is used to detect the multi-scale visual marker 300 (e.g., in an image). In some implementations, the first set of markings 310 has a distinctive or unique shape. In some implementations, the first set of markings 310 has a distinctive shape that does not match shapes that occur in nature (e.g., natural shapes or size ratios). In some implementations, the first set of markings 310 has a distinctive shape that does not match shapes that are manmade (e.g., rectangular shapes like bricks or size ratios). In some implementations, the first set of markings 310 is an area or shape having predefined shape or a predefined ratio of dimensions (e.g., thickness to diameter). In some implementations, the first set of markings 310 is a single color (e.g., grey, white). In some implementations, the first set of markings 310 uses one or more colors that are not used elsewhere in the multi-scale visual marker 300. In some implementations, the first set of markings 310 is a preset number pixels (e.g., tall, wide, etc.) as seen by an image sensor on an electronic device.

In some implementations, the detection of the multi-scale visual marker 300 in an image (e.g., of a physical environment) can be accomplished using machine learning (ML). ML methods for object detection include machine learning-based approaches or deep learning-based approaches. In some implementations, machine learning approaches first define features from a set of data that contains both the inputs and the desired outputs, then uses a classification technique to identify an object. In some implementations, deep learning techniques do end-to-end object detection without specifically defining features, for example, using convolutional neural networks (CNN). In some implementations, colors of the first set of markings are different for different visual markers, and accordingly, the detection of the multi-scale visual marker 300 uses shape-based ML to detect the first set of markings. In some implementations, colors of the first set of markings are consistent (e.g., the same for different visual markers), and accordingly, the detection of the multi-scale visual marker 300 uses shape and color-based ML to detect the first set of markings.

In some implementations, the multi-scale visual marker 300 includes the multiple sets of markings 310, 320, 330, where each of the sets of markings encodes information using the same or different encoding techniques. In some implementations, the multi-scale visual marker 300 includes multiple sets of markings 310, 320, 330, where at least one of the markings uses a different encoding technique.

In some implementations, the multi-scale visual marker 300 intermixes the multiple sets of markings 310, 320, 330. In some implementations, the multi-scale visual marker 300 spatially separates the multiple sets of markings 310, 320, 330. As shown in FIG. 3, the multi-scale visual marker 300 intermixes the sets of markings 310, 320, 330.

In some implementations, the multiple sets of markings 310, 320, 330 of the multi-scale visual marker 300 include parameterized graphical elements that each encode at least 1 bit of data. In some implementations, the multiple sets of markings 310, 320, 330 of the are encoded using elements that are parameterized by size, shape, color, orientation, or the like of graphical elements.

In some implementations, a first color of multiple sets of markings 310, 320, 330 of the multi-scale visual marker 300 and the second color for the background of the multi-scale visual marker 300 are selected anywhere within a spectrum of colors. In some implementations, the first color and the second color of the multi-scale visual marker 300 may be any color, but generally the two colors are selected based on detectability or aesthetics. In some implementations, detectability of the two colors is based on one or more of separation in a 3D color space, lighting conditions, printing conditions, displaying conditions, image capture sensors, or aesthetic information. In some implementations, the colors for the multi-scale visual marker 300 are not used to encode data.

Figure 4A:
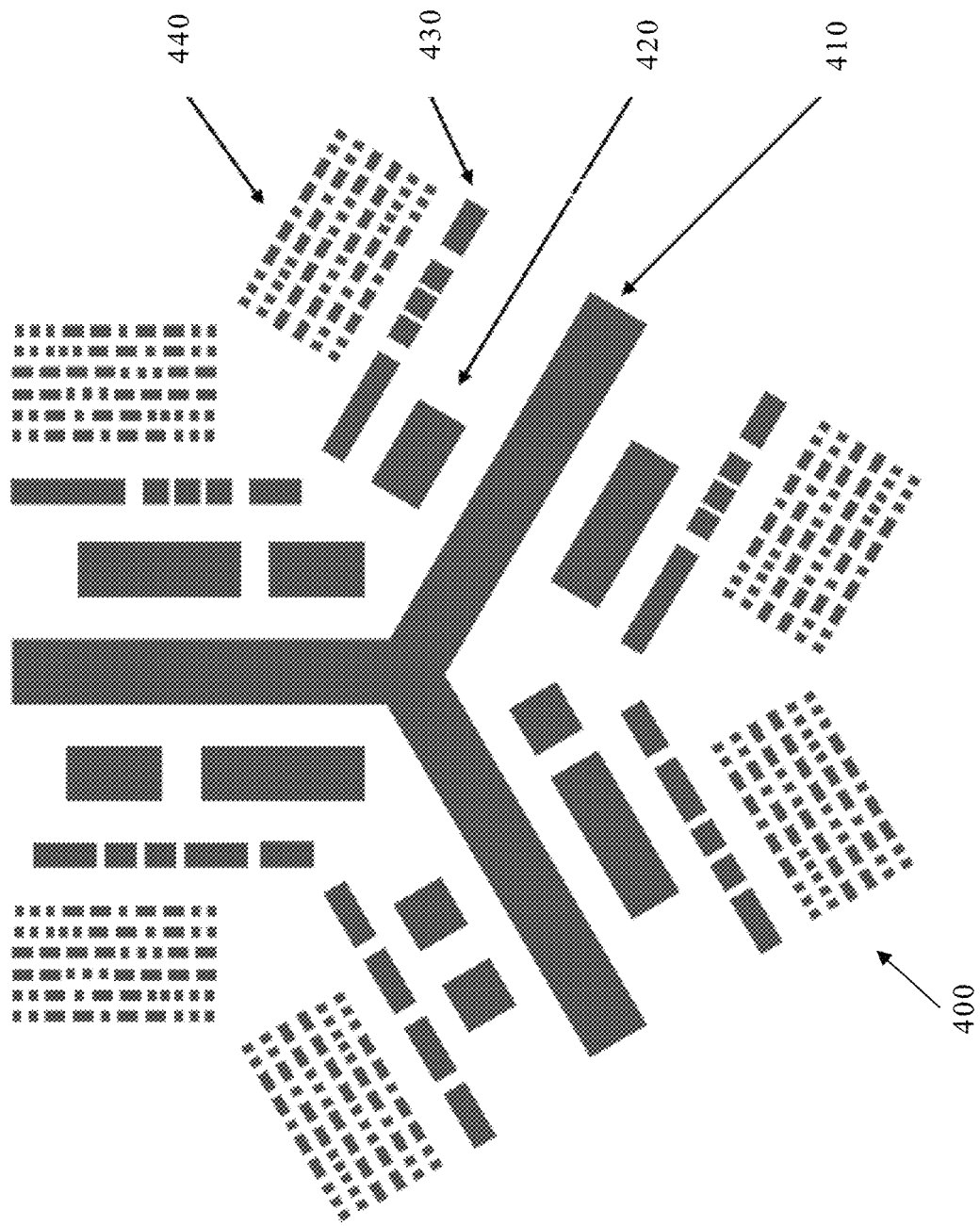
FIGS. 4A-4B are diagrams illustrating an exemplary multi-scale visual marker in accordance with some implementations.
Figure 4B:
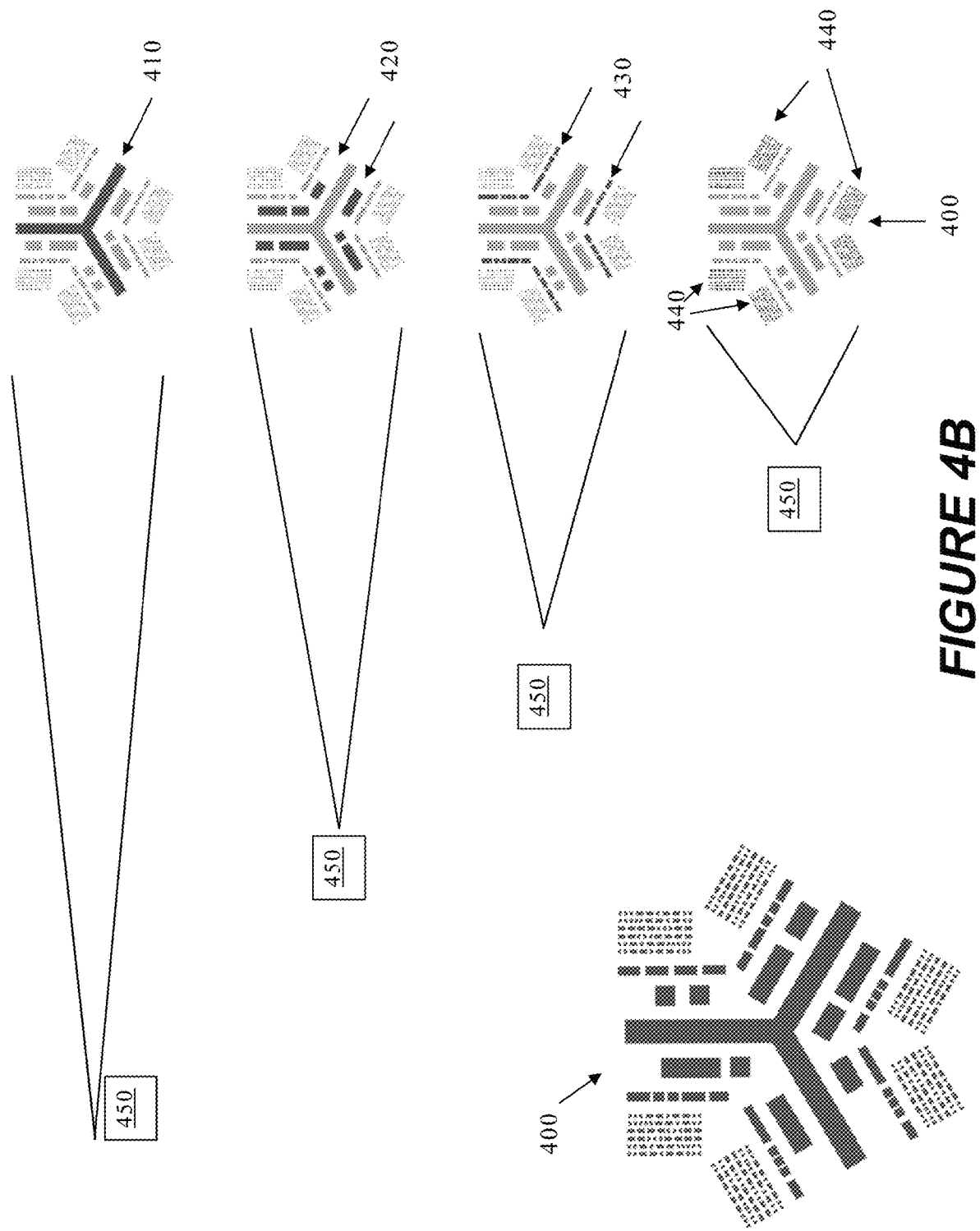

FIGS. 4A-4B are diagrams illustrating an exemplary multi-scale visual marker in accordance with some implementations. In some implementations, the multi-scale visual marker encodes data in multiple sets of markings using different scales (e.g., different sizes, different numbers of markings per unit of space, different color characteristic such as contrast, different wavelengths, or different image sensor types). As shown in FIG. 4, a multi-scale visual marker 400 includes a first set of markings 410, a second set of markings 420, a third set of markings 430, and a fourth set of markings 440.

In some implementations, an electronic device 450 is able to detect the multi-scale visual marker 400 from a first distance. In some implementations, the electronic device 450 is able to detect the multi-scale visual marker 400 in an image of the physical environment at the first distance. In some implementations, first distance is 10 to 15 m. In some implementations, the first set of markings 410 (e.g., scale zero "0") includes first encoded data for the multi-scale visual marker 400. In some implementations, the first set of markings 410 are used to determine the occurrence of the multi-scale visual marker 400 in a physical environment (e.g., binary detection process yes/no). In some implementations, the first set of markings 410 provide an orientation or a version of the multi-scale visual marker 400.

In some implementations, the second set of markings 420 (e.g., scale one "1") of the multi-scale visual marker 400 is detectable at a second distance. In some implementations, the electronic device 450 is able to detect the second set of markings 420 in an image of the physical environment at least from the second distance (or less). In some implementations, the second distance is 5 to 7 m. In some implementations, scale "1" information includes second encoded data for the multi-scale visual marker 400. In some implementations, scale "1" information includes a high-level type for the multi-scale visual marker 400. For example, visual marker types may include information types, product types, entertainment types, emergency types, etc.

In some implementations, a third set of markings 430 (e.g., scale two "2") of the multi-scale visual marker 400 is detectable at a third distance. In some implementations, the electronic device 450 is able to detect the third set of markings 430 in an image of the physical environment at least from the third distance (or less). In some implementations, the third distance is 2 m. In some implementations, scale "2" information includes third encoded data for the multi-scale visual marker 400. In some implementations, the scale 2 information includes context information for the multi-scale visual marker 400. For example, the scale 3 information may be a restaurant type and name, or a set of manufactures producing products that meet criteria and are sold by 1 retailer.

In some implementations, a third set of markings 440 (e.g., scale three "3") of the multi-scale visual marker 400 is detectable at a fourth distance. In some implementations, the electronic device 450 is able to detect the fourth set of markings 440 in an image of the physical environment at least from the fourth distance (or less). In some implementations, the fourth distance is 0.5 m. In some implementations, scale "3" information includes fourth encoded data for the multi-scale visual marker 400. In some implementations, the scale 3 information include detailed information for the multi-scale visual marker 400. For example, the scale 3 information may be a menu with prices for a restaurant, product information such as a product ID, manufacture, model, cost, or availability of the product, or a train schedule with destinations, fares, departure times for a subway line.

Figure 5A:
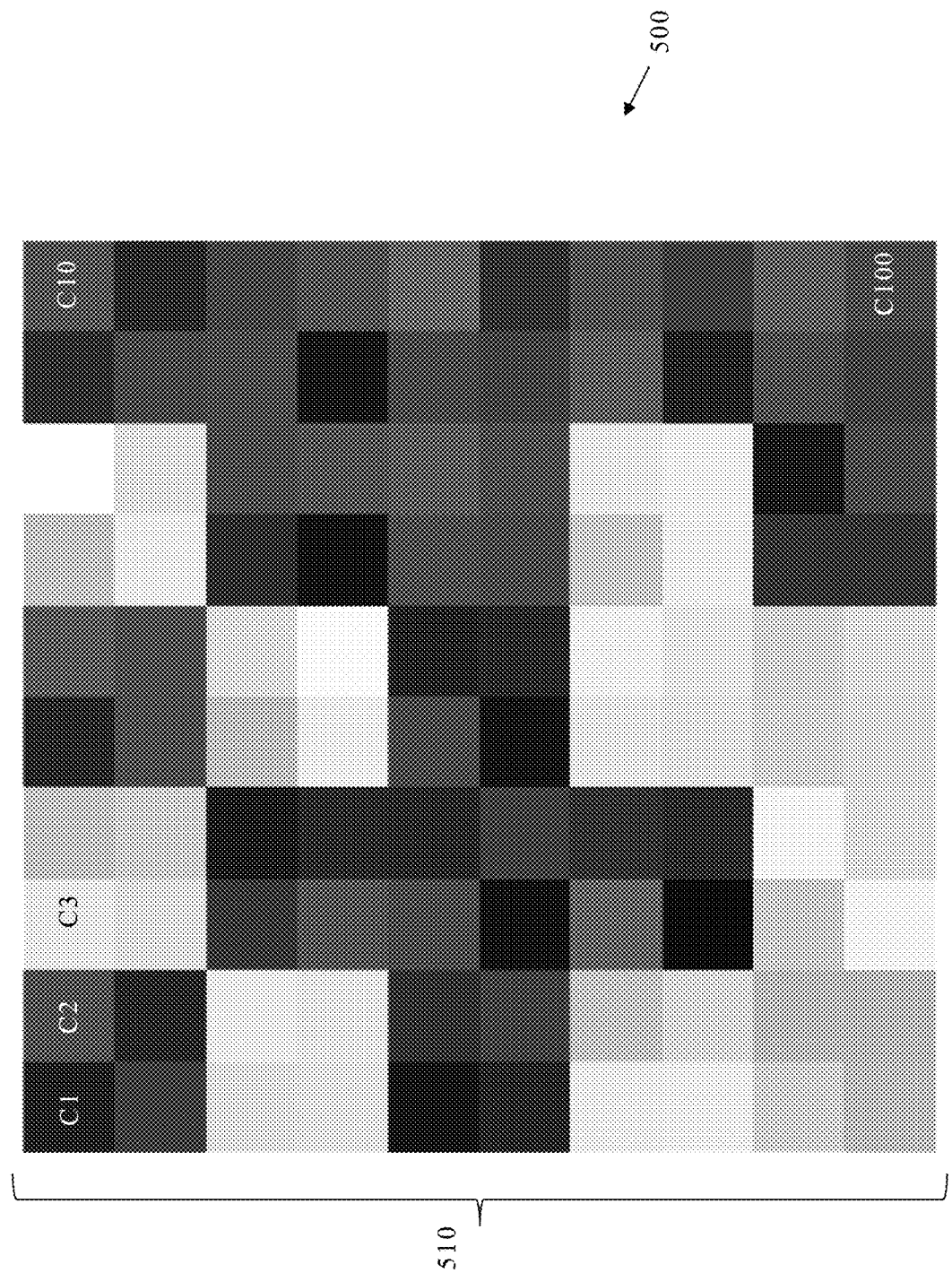
FIGS. 5A-5C are diagrams illustrating another exemplary multi-scale visual marker in accordance with some implementations.
Figure 5B:
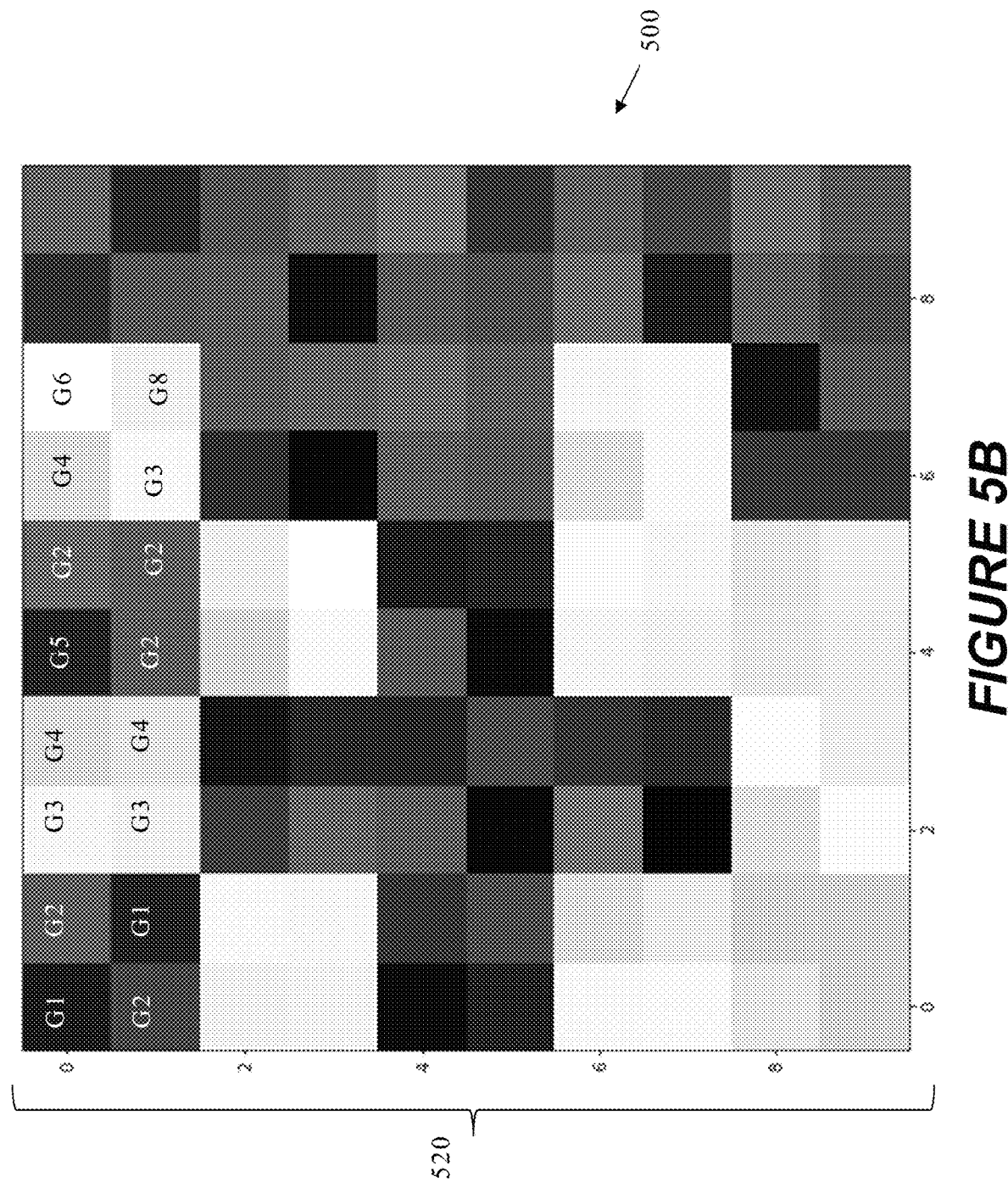
Figure 5C:
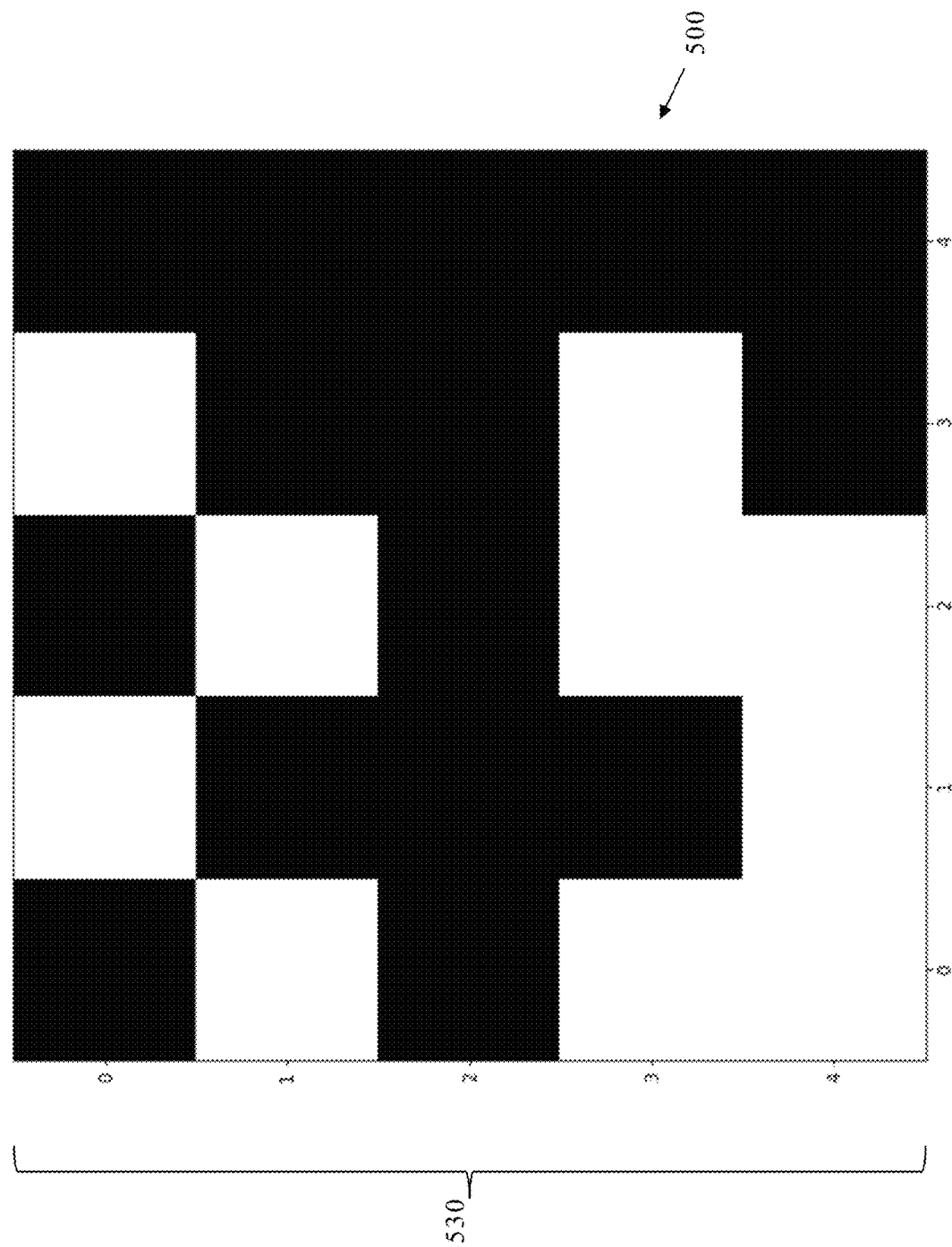

FIGS. 5A-5C are diagrams illustrating images of an exemplary multi-scale visual marker in accordance with some implementations. In some implementations, the multi-scale visual marker encodes data in multiple sets of markings using different color characteristics such as contrast. As shown in FIGS. 5A-5C, a multi-scale visual marker 500 includes multiple sets of markings 510, 520, 530.

FIG. 5A shows colored set of markings 510 for a multi-scale visual marker 500. In some implementations, the colored set of markings store or encode the most information because each color can represent different information. As shown in FIG. 5A, each of the 100 markings (e.g., square) uses a different color C1, C2, . . . C100. In another example, if the colored multi-scale visual marker 500A used 32 colors, each of the markings can encode 5 bits of data. In some implementations, each 2×2 section in the colored multi-scale visual marker 500A is either bright or dark.

FIG. 5B shows a greyscale set of markings 520 for the multi-scale visual marker 500. In some implementations, the multi-scale visual marker 500 is viewed with a greyscale camera to obtain the greyscale set of markings 520. In some implementations, the greyscale set of markings 520 store or encode less information than the colored set of markings 510. As shown in FIG. 5B, each of the 100 markings (e.g., square) uses one of 8 greyscale colors G1, G2, . . . , G8 to encode 3 bits of data. In some implementations, each of the 100 markings (e.g., square) use one of 16 greyscale colors to encode 4 bits of data.

FIG. 5C shows a monochrome set of markings 530 for the multi-scale visual marker 500. In some implementations, the multi-scale visual marker 500 is viewed with a camera that only recognizes black and white to obtain the monochrome set of markings 530. In some implementations, the monochrome set of markings 530 store or encode less information than the greyscale set of markings 520. As shown in FIG. 5C, each of the 25 markings (e.g., square) uses black or white to encode 1 bit of data. In some implementations, the monochrome set of markings 530 have less granularity than the greyscale set of markings 520.

In some implementations, the multi-scale visual marker 300, 400, 500 is a 2D/3D object that encodes information in a preset format (e.g., binary format) such as strings or other payloads used to access remotely-based experiences. In some implementations, the links to the remotely-based experiences include links to initiate payments (e.g., sanctioned payment endpoints), links to websites (e.g., URLs), or links that launch into web-based experiences. In some implementations, the multi-scale visual marker is used to launch only into or link only to sanctioned remotely-based experiences authorized by the creator of the multi-scale visual marker. In some implementations, the creator of the multi-scale visual markers includes an entity that designs the multi-scale visual marker, an entity that prints (e.g., makes) the multi-scale visual marker (e.g., developer), as well as an entity that manages/hosts the multi-scale visual markers.

Figure 6:
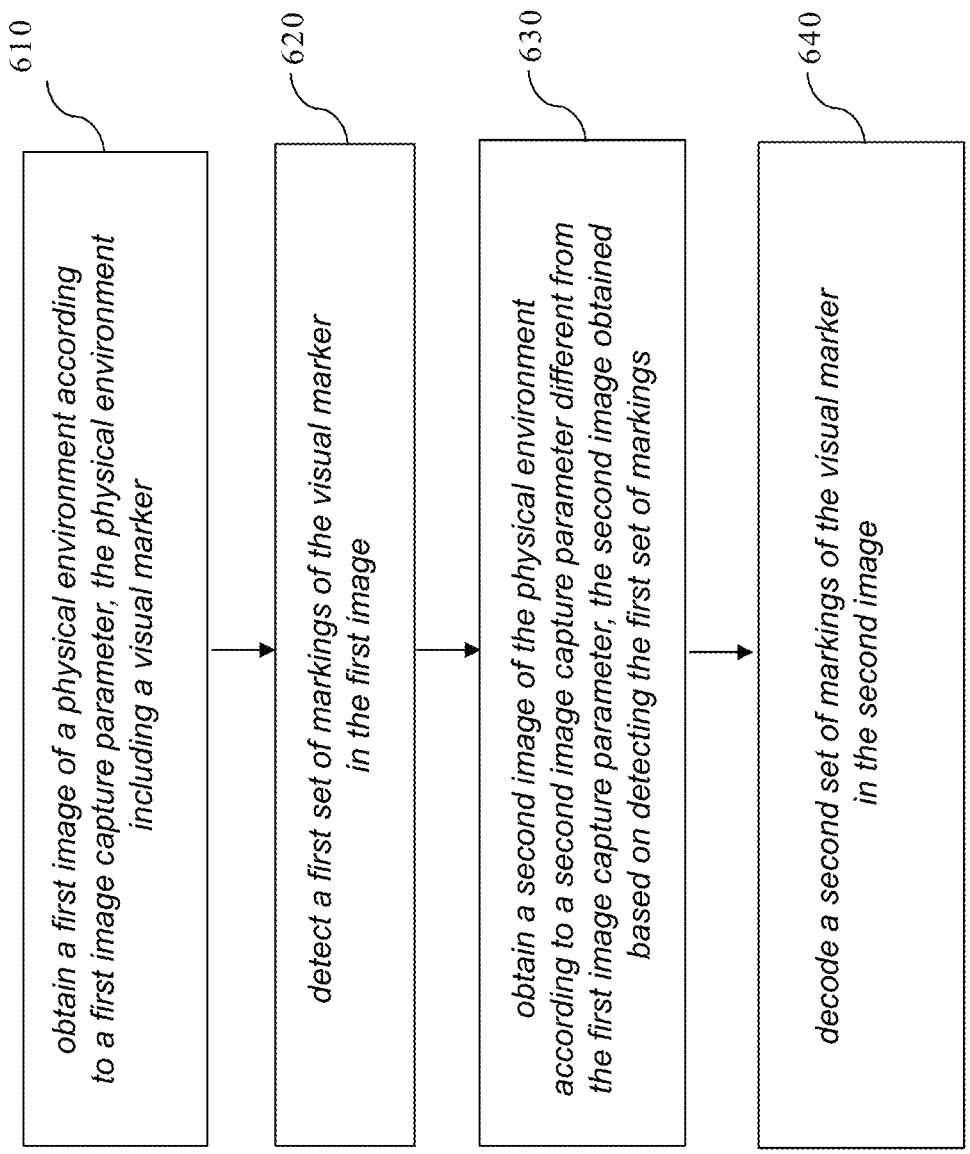
FIG. 6 is a flowchart illustrating an exemplary method of hierarchical decoding of a multi-scale visual marker in accordance with some implementations.

FIG. 6 is a flowchart illustrating an exemplary method of hierarchical decoding of a multi-scale visual marker in accordance with some implementations. In some implementations, multi-scale visual marker encodes data in multiple sets of markings using different appearance attributes corresponding to different detection or encoding techniques. In some implementations, the different appearance attributes are different scales (e.g., size or # per unit of space, different contrast, or different wavelengths (e.g., IR, visible light differences)). In some implementations, increasingly higher-resolution images from an image sensor are used to hierarchically detect and/or decode additional scales of the multi-scale visual marker. In some implementations, the method 600 is performed by a device (e.g., electronic device 120, 200 of FIGS. 1-2). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains a first image of a physical environment according to a first image capture parameter, the physical environment including a visual marker. In some implementations, the first image is a low resolution (e.g., 64×64 pixel) image. In some implementations, low resolution (e.g., 64×64) first images are periodically obtained of the physical environment. In some implementations, the first images of the physical environment are periodically obtained in a low power operating mode of a processor of the electronic device. In some implementations, an always-on hardware component of the processor is used to continuously search for visual markers in the physical environment by repeatedly obtaining first images from an image sensor on the electronic device.

At block 620, the method 600 detects a first set of markings of the visual marker in the first image. In some implementations, the first set of markings is a very high scale (e.g., large or low frequency) feature embedded in the visual marker. In some implementations, the first set of markings are used for binary detection (e.g., visual marker/no visual marker within the electronic device FOV or the user FOV) because the first set of markings can be detected at low resolution in the first image (e.g., a 64×64 full-FOV image). In some implementations, binary detection of the visual marker using the first set of markings enables power efficient detection because both the image sensor (e.g., camera) and the processor (e.g., SOC) respectively capture and process a small number of pixels (e.g., 4096 pixels) to perform such detection. In some implementations, the detection of the visual marker in the first image (e.g., using the first set of markings) uses an always-on domain of the SOC and executes continuously to analyze first images. In some implementations, the first set of markings are visible or detectable in the first image at a preset distance such as 15 m or 20 m.

In some implementations at block 620, the visual marker is viewable at a surface of an object in the physical environment. In some implementations, the visual marker is printed on the surface of the object. In some implementations, the visual marker is printed by a 2D or 3D printer. In some implementations, the visual marker is printed by a black and white printer or a color printer (e.g., RGB or CYMK). In some implementations, the visual marker is colored etched, painted, powdered, drawn, sprayed, or the like onto the surface of the object. In some implementations, the visual marker is displayed by a display or projected by a projector on the object in the physical environment. In some implementations, the display or the projector is self-luminescent, emissive, transmissive, or reflective.

At block 630, the method 600 obtains a second image of the physical environment according to a second image capture parameter different from the first image capture parameter, the second image obtained based on detecting the first set of markings. In some implementations, the second image capture parameter includes increased detail of the visual marker. In some implementations, the second image of the physical environment is obtained at a higher resolution (e.g., 256×256 pixels) than the first image by the electronic device. In some implementations, the second image of the physical environment is obtained at a greater granularity (e.g., zoomed-in) than the first image. In some implementations, a plurality of second images are obtained in immediate succession of the visual marker in the physical environment. In some implementations, at least one second image is automatically initiated upon detection of the first markings in the first image. In some implementations, the second image of the physical environment is obtained in a second higher power operating mode of the electronic device.

At block 640, the method 600 decodes a second set of markings of the visual marker in the second image. In some implementations, the second set of markings is a smaller scale (e.g., smaller size or higher frequency set of markings) than the first set of markings. In some implementations, the second set of markings encodes information about the visual marker. In some implementations, the second set of markings encodes high level information about the visual marker. In some implementations, the second set of markings encodes a high-level category for the visual marker (e.g., information visual marker, product visual marker, directions visual marker, space visual marker, emergency visual marker, etc.) and could be used to discriminate the visual marker among categories of visual markers. In some implementations, the detection of the second set of markings in the second image is a second step of the hierarchical processing and decoding of the visual marker that is triggered only when the first set of markings is detected in the first image, which determined that the visual marker is present within the FOV. In some implementations, the detection of the second set of markings in the second image requires a higher resolution image (e.g., 256×256 pixels) to capture details of the second set of markings. In some implementations, the detection of the second set of markings in the second image requires more processing power because both the image sensor (e.g., camera) and the processor (e.g., SOC)) respectively capture and process a higher number of pixels (e.g., 65,536 pixels) to perform such detection. In some implementations, the detection of the second set of markings in the second image uses a second domain of the SOC that only executes to analyze second images. In some implementations, the detection of the second set of markings in the second image enables power efficient detection because both the image sensor (e.g., camera) and the processor (SOC) are triggered and execute only when needed. In some implementations, the second set of markings are visible or detectable in the second image at a preset distance such as less than 10 m.

In some implementations, the visual marker has a unique detectable orientation. In some implementations, the method 600 decodes data encoded the second set of markings based on an orientation of the visual marker. In some implementations, the orientation is determined using the first set of markings, the second set of markings, an additional set of markings, or an additional feature embedded in the visual marker. In some implementations, the first image and the second image may be rectified to account for image capture conditions. In some implementations, rectification warps the visual marker from the image to make the visual marker appear flat when viewed from a directly overhead orientation.

In some implementations, the method 600 obtains a third image of the physical environment according to a third image capture parameter different from the first image capture parameter and the second image capture parameter, the third image obtained based on detecting the second set of markings. In some implementations, the third image capture parameter includes increased detail of the visual marker (e.g., compared to the second set of markings). In some implementations, the third image of the physical environment is obtained at a higher resolution (e.g., 512× 512 pixels) than the second image by the electronic device. In some implementations, the third image of the physical environment is obtained at a greater granularity (e.g., zoomed-in) than the second image. In some implementations, a plurality of third images are obtained in immediate succession of the visual marker in the physical environment. In some implementations, at least one third image is automatically initiated upon detection of the second markings in the second image or the first markings in the first image. In some implementations, the third image of the physical environment is obtained in a third higher power operating mode (e.g., compared to the second operating mode) of the electronic device.

In some implementations, the method 600 decodes a third set of markings of the visual marker in the third image. In some implementations, the third set of markings is a smaller scale (e.g., smaller size or higher frequency set of markings) than the second set of markings. In some implementations, the third set of markings that encodes additional information about the visual marker. In some implementations, the third set of markings that encodes detailed information for the visual marker. In some implementations, the third set of markings encodes at least 256 bits of information for the visual marker and could be used to discriminate visual markers within one category of visual markers. In some implementations, the detection of the third set of markings in the third image is a third step of the hierarchical processing and decoding of the third set of markings is triggered only when the second set of markings is decoded, and the user of the electronic device is interested in the visual marker based on the second set of markings (e.g., category). In some implementations, the detection of the third set of markings in the third image requires a higher resolution image (e.g., 512×512 pixels) to capture details of the third set of markings. In some implementations, the detection of the third set of markings in the third image requires more processing power because both the image sensor (e.g., camera) and the processor (e.g., SOC)) respectively capture and process a higher number of pixels (e.g., 262,144 pixels) to perform such detection. In some implementations, the detection of the third set of markings in the third image uses a third domain of the SOC that only executes to analyze third images. In some implementations, the detection of the third set of markings in the third image enables power efficient detection because both the image sensor (e.g., camera) and the processor (SOC) are triggered and execute only when needed. In some implementations, the first domain, the second domain, and the third domain of the SOC are implemented as multiple separate dedicated hardware circuits (e.g., silicon IP, hardware accelerators, etc.) that are enabled independently, hierarchically, or on demand. In some implementations, the third set of markings are visible or detectable in the third image at a preset distance such as less than 1 m or 0.5 m.

In some implementations, the electronic device includes a UI that receives instructions from a user of the electronic device that results in movement, adjustment (e.g., zoom, flash), or hardware selection to get more information for the visual marker. For example, some instructions may be displayed based on decoding scale 1—tag type (movie theater, restaurant, etc.). In this case, information may be displayed to the user that upon selection or action, would increase the visible details or granularity of the visual marker. For example, the visual marker is determined to be 90° to the right and 25 m away, and the user is prompted to turn to the right and move 15 m closer (e.g., to allow a better image that includes the scale 2 information—type of restaurant, scale 3 information—hours of operation, and scale 4 information—lunch or dinner menu with prices).

In some implementations, the appearance attribute includes a marker size such as marker height, marker width, or marker area. In some implementations, the size attribute includes detectable or preset physical sizes, for example, scales 0 to 3 have respective sizes of 24, 1, ¼, ¹/₁₆ inches. In some implementations, the size attribute includes preset or detectable relative physical sizes for example, scales 0 to 3 have a respective physical ratio so that the size of one scale is 2× or 1.5× the immediately smaller scale.

In some implementations, the appearance attribute includes a number of markings per unit of space (e.g., frequency) within the visual marker. In some implementations, the size attribute includes detectable or preset frequencies or respective frequency ratios so that the frequency of one scale is 2× or 1.5× the immediately larger scale.

In some implementations, the appearance attribute includes contrast or color. In some implementations, the contrast can decrease from scale 0 to scale 3. In one example, the contrast scale 0 uses black and white, scale 1 is greyscale and scale 2 (or more) use colors even less contrast. Accordingly, two different colors may have the same contrast (e.g., greyscale value). In this example, some shades of red and green would look the same in a grayscale image (e.g., color filter), but in a color image viewed by a color camera, the shades of red and green look very different (e.g., scale 2 or color).

In some implementations, the appearance attribute includes wavelengths or image sensor types. In some implementations, scale 0 can use an IR sensor and scale 1 can use an RGB sensor.

In some implementations, the visual marker has a preset shape such as an asymmetric shape, a symmetric shape, an ellipse, a rectangle, a triangle, a bow tie, or the like. In some implementations, the multiple sets of markings are variously spatially separated or spatially intermixed. In some implementations, the multiple sets of markings of the visual marker includes a plurality of increasingly larger shapes (e.g., polygons, rings, etc.) of markings. In some implementations, scale 0 markings have a preset shape that surrounds scale 1 markings, scale 1 markings have a preset shape that surrounds scale 2 markings, scale 3 markings have a preset shape that surrounds scale markings, and so on. In some implementations, at least one of the shapes is different, or all of the shapes are the same.

In some implementations at blocks 610 and 630, an image sensor at an electronic device captures the image of the physical environment including the visual marker. In some implementations, the sensor can be a RGB camera, a depth sensor, a RGB-D camera, monochrome cameras, one or more 2D cameras, event cameras, IR cameras, or the like. In some implementations, combinations of sensors are used. In some implementations, the sensor is used to generate a XR environment representing the physical environment. In some implementations, color images can be used. Alternatively, in some implementations, grayscale images can be used.

In some implementations at block 640, the method 600 further decodes the data of the visual marker into binary data such as strings or other payloads to initiate payments, link to websites, link to location-based experiences or contextual-based experiences, or launch into other web-based experiences. In some implementations, the usage of the visual marker in terms of user experience after decoding can be arbitrary. For example, the visual marker may be displayed on a TV and upon being scanned, the decoded data may help the user select options, obtain information about the movie being displayed on the TV, etc. In another example, the decoded data from the visual marker when scanned by the user may initiate an application on the scanning electronic device (e.g., smart phone) such as a food delivery app. In some implementations, the visual marker may be displayed and upon being scanned, the decoded data delivers an audio message or music to the decoding electronic device.

In some implementations, a version of the visual marker is encoded in a first portion (e.g., a first set of markings) of the visual marker. In some implementations, the version(s) of the visual marker varies a number of the multiple sets of markings, varies colors used in the visual marker, varies an amount of data, or varies the graphic segments used to encode data.

In some implementations, at block 610 or block 630, the method 600 determines a relative positioning between a detecting electronic device and the visual marker based on the image or images. In some implementations, the relative positioning determines the relative orientation of the visual marker with respect to the detecting electronic device. In some implementations, the relative positioning is determined using computer vision techniques (e.g., VIO or SLAM) or PNP techniques. In some implementations, relative positioning is determined based on stereo image processing (e.g., disparity-based estimation). In some implementations, the relative positioning determines distance or direction from the detecting electronic device to the visual marker. In some implementations, the relative positioning determines the pose (e.g., position and orientation) of the detected visual marker relative to the pose of the detecting electronic device. In some implementations, the relative positioning is determined at the detecting electronic device by identifying the size or scale (e.g., preset, encoded or determined using computer vision) of the detected visual marker in the captured image. Alternatively, the distance between the detecting electronic device and the detected visual marker can be determined based on a depth sensor at the detecting electronic device detecting the visual marker in the physical environment. In some implementations, the depth sensor at the detecting electronic device uses stereo-based depth estimation. In some implementations, the depth sensor at the detecting electronic device is a depth-only sensor (e.g., time of flight, structured light).

In some implementations, the multiple sets of markings encode the data of the visual marker using graphic elements. In some implementations, the graphic elements are parameterized by size, shape, color, orientation, or the like in the visual marker.

Various implementations disclosed herein include devices, systems, and methods that provide a multi-scale visual marker including various features described herein (e.g., individually or in combination).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A visual marker that conveys information, the visual marker comprising:
    a first set of markings that encode first data;
    a second set of markings that encode second data, the second set of markings different than the first set of markings;
    wherein markings of the first set differ from markings of the second set with respect to an appearance attribute, and wherein detecting or decoding the first set of markings selectively triggers a detection of the second set of markings, thereby identifying that the visual marker includes the second set of markings.

2. The visual marker of claim 1, wherein the appearance attribute is physical size, and wherein the physical size is a marker height, marker width, or marker area.

3. The visual marker of claim 1, wherein the appearance attribute is a marker frequency defined by a number of markings per unit of space within the visual marker.

4. The visual marker of claim 1, wherein the appearance attribute is contrast.

5. The visual marker of claim 1, wherein the appearance attribute is color.

6. The visual marker of claim 1, wherein the appearance attribute corresponds to wavelength.

7. The visual marker of claim 1, further comprising a third set of markings that encode third data,
    wherein markings of the third set differ from markings of the first set differ and markings of the second set with respect to the appearance attribute,
    wherein the appearance attribute of markings of the third set corresponds to a third encoding parameter different from the first encoding parameter and the second encoding parameter.

8. The visual marker of claim 7, wherein the third set of markings encode more data than the second set of markings, and the second set of markings encode more data than the first set of markings.

9. The visual marker of claim 1, wherein the first set of markings and the second set of markings are intermixed in the visual marker.

10. A method comprising:
    at an electronic device having a processor:
        obtaining a first image of a physical environment according to a first image capture parameter, the physical environment comprising a visual marker;
        detecting or decoding a first set of markings of the visual marker in the first image, wherein the first set of markings encodes first data in accordance with an appearance attribute;

selectively triggering, in response to said detecting or decoding, a detection of a second set of markings of the visual marker in a second image of the physical environment;

obtaining the second image of the physical environment according to a second image capture parameter different from the first image capture parameter, the second image obtained based on said detecting or decoding the first set of markings;

identifying based on said detecting or decoding the first set of markings that the visual marker includes the second set of markings; and decoding a second set of markings of the visual marker in the second image.

11. The method of claim 10, wherein markings of the first set differ from markings of the second set.

12. The method of claim 10, wherein first image capture parameter is a first resolution and the second image capture parameter is a second resolution different than the first image capture parameter.

13. The method of claim 10, obtaining a third image of the physical environment according to a third image capture parameter different from the first image capture parameter and the second image capture parameter, the third image obtained based on detecting the first set of markings; and decoding a third set of markings of the visual marker in the third image, wherein markings of the third set differ from markings of the first set and markings of the second set with respect to an appearance attribute.

14. The method of claim 10, wherein the first image capture parameter corresponds to a first camera and the second image capture parameter corresponds to a second camera different than the first camera.

15. The method of claim 10, further comprising:
using a first portion of a system-on-chip (SOC) to detect the first set; and
using a second portion of the SOC to detect the second set, wherein the first portion and the second portion are implemented as multiple separate dedicated hardware circuits.

16. The method of claim 15, wherein the first portion of the SOC is always on and the second portion of the SOC is selectively enabled.

17. The method of claim 10 further comprising:
decoding the first data from the first set of markings, the first data comprising a first level of information; and
providing content on the device based on the first level of information.

18. The method of claim 17, wherein the content comprises an instruction to move or zoom the device.

19. The method of claim 18, further comprising:
wherein decoding the second set of markings decodes a second level of information;
providing second content on the device based on the second level of information, wherein the second content comprises the second level of information and a second instruction to move or zoom the device for more information.

20. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining a first image of a physical environment according to a first image capture parameter, the physical environment comprising a visual marker;
detecting or decoding a first set of markings of the visual marker in the first image, wherein the first set of markings encodes first data in accordance with an appearance attribute;
selectively triggering, in response to said detecting or decoding, a detection of a second set of markings of the visual marker in a second image of the physical environment;
obtaining the second image of the physical environment according to a second image capture parameter different from the first image capture parameter, the second image obtained based on said detecting or decoding the first set of markings;
identifying based on said detecting or decoding the first set of markings that the visual marker includes the second set of markings; and
decoding a second set of markings of the visual marker in the second image.

* * * * *